Patented Jan. 5, 1926.

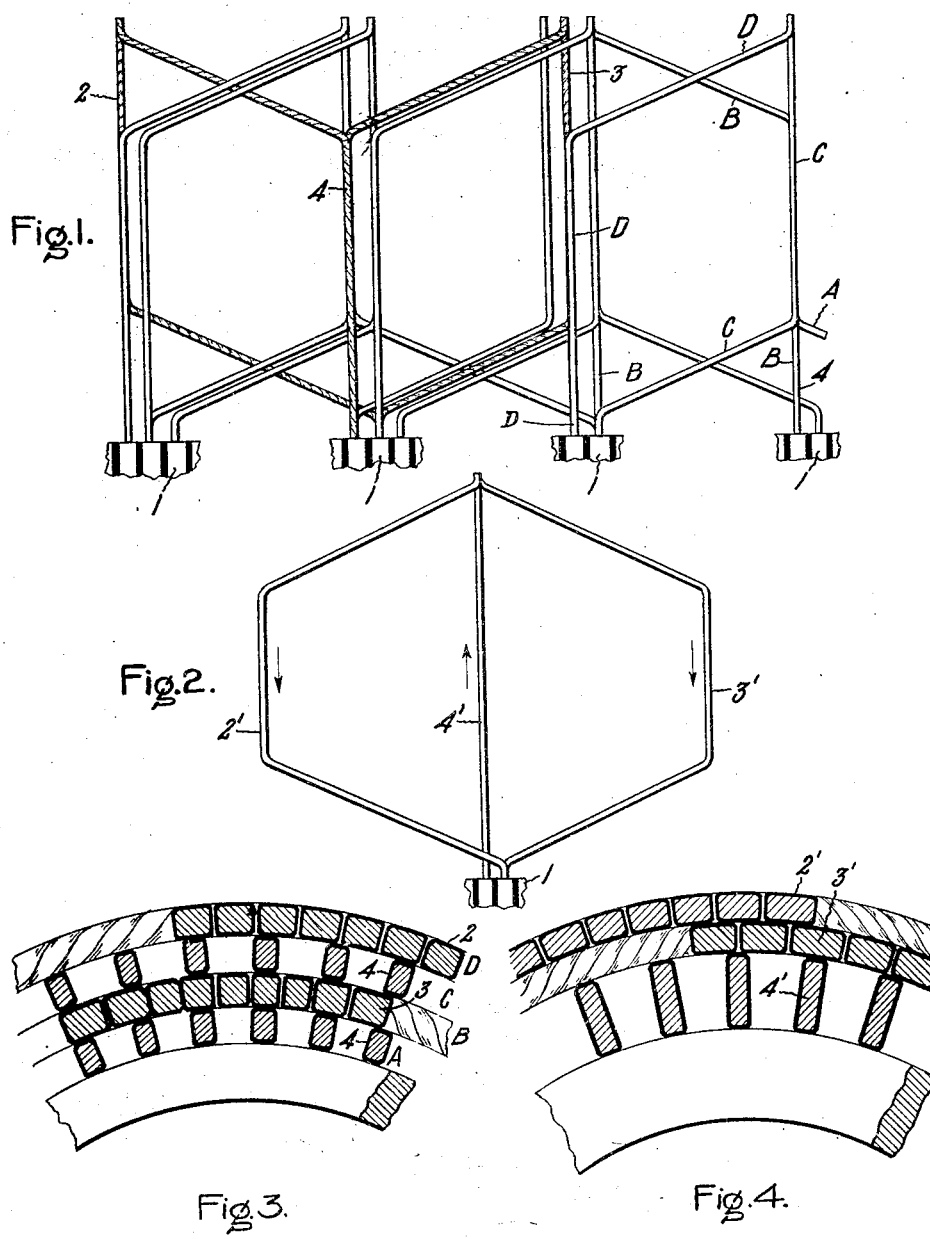

1,568,692

UNITED STATES PATENT OFFICE.

ALAN ADAIR POLLOCK, OF LEAMINGTON SPA, ENGLAND, ASSIGNOR TO GENERAL ELECTRIC COMPANY, A CORPORATION OF NEW YORK.

DYNAMO-ELECTRIC MACHINE.

Application filed March 19, 1925. Serial No. 16,652.

*To all whom it may concern:*

Be it known that I, ALAN ADAIR POLLOCK, a subject of the British Empire, residing at Leamington Spa, England, have invented certain new and useful Improvements in Dynamo-Electric Machines, of which the following is a specification.

This invention relates to dynamo electric machines and more particularly to machines of the commutating type. In such machines it is desirable, when the current per circuit is large, to divide the current, commuted at any particular commutator segment, between a plurality of slots, as by this means greatly improved commutating conditions can be obtained and consequently the limit of capacity for successful commutation can be raised.

According to the present invention this division of the current is effected by providing an armature winding comprising coils, in each of which the current in one conductor is divided into two and returns through two conductors which are in parallel and situated 360 electrical degrees apart, each parallel path being located 180 electrical degrees away from the first mentioned conductor. With this arrangement of armature winding, any coil under commutation will come under the influence of three commutating poles, so that there will be a tendency towards self-equalization making it unnecessary to provide equalizer connections.

For a better understanding of my invention, reference may be had to the following description taken in connection with the accompanying drawing, in which Fig. 1 is a developed plan view of a portion of an armature winding embodying my invention; Fig. 2 shows a modified form of coil of an armature winding embodying my invention, the shape of the coil being different than that shown in Fig. 1; Fig. 3 is an end sectional view of my armature winding arranged as a four layer winding, and Fig. 4 is an end sectional view of my armature winding arranged as a three layer winding.

Referring to Fig. 1 of the drawing, there is shown an armature winding connected to a commutator 1, the armature winding comprises coils, each of which comprises a plurality of conductors 2, 3 and 4. Two of the conductors, that is conductors 2 and 3, are located substantially 360 electrical degrees, or two pole pitches, apart, and the other conductor 4 is located substantially 180 electrical degrees, or one pole pitch, from the first mentioned conductors 2 and 3. One complete coil is shown as covered with insulation. In this figure certain of the end windings form straight extensions of the conductors in the slot and other end windings form extensions which are offset a full pole pitch. A four layer winding is shown in this figure and in Fig. 3, coil A being placed in the bottom of the slot and coils B, C and D, forming the second, third and fourth layers, respectively. The order in which the layers are put into the slot may be varied as desired. By arranging the coils as shown, the coil pitch covers two pole pitches and the current which flows through conductor 4 divides and flows through the two paths formed by conductors 2 and 3. The ends of conductors 2, 3 and 4 at the commutator end of the armature are connected to the commutator 1.

The form of coil shown in Fig. 2 is similar to that shown in Fig. 1, except for the end connections. In this figure, conductors 2' and 3' are spaced 360 electrical degrees apart and conductor 4' is located 180 electrical degrees from both conductors 2' and 3'. The end connections of conductors 2' and 3' at both ends of the armature are offset a full pole pitch, whereas conductor 4' is substantially straight from end to end. The current flowing through conductor 4' divides and flows through the two paths formed by conductors 2' and 3'.

The conductor 4 in Fig. 1 and the conductor 4' in Fig. 2 should have a cross section substantially twice that of the other conductors since it carries twice the current. Each of the conductors 4 or 4' may be made as a single conductor or as two separate conductors in parallel. In Figs. 1 and 3 they are shown as separate conductors, whereas in Figs. 2 and 4 they are shown as single conductors.

The coils of my armature winding have two conductors, 2 and 3 in Fig. 1, and 2' and 3' in Fig. 2, in parallel generating substantially the same voltage which is added to the voltage generated in conductor 4 in Fig. 1 and 4' in Fig. 2. The closed loop formed by conductors 2 and 3 or 2' and 3' being two pole pitches apart, serves as an equalizer to equalize the flux in the poles and thus equalize the voltage generated in the parallel circuits in the armature. These closed loops are distributed completely around the armature and equalize the flux at all points, in the same way as the usual equalizer connections heretofore in use on dynamo electric machines of the commutating type.

A lap winding has been illustrated in the drawings, but it is obvious that the invention is equally applicable to a wave winding.

The type of coil shown in Fig. 1, in which the end connections are straight extensions of the slot portions particularly lends itself to the slot insulation being carried right out to form the end winding insulation and can conveniently be moulded, thus keeping a continuous insulation throughout the slot and end winding. By suitably arranging the various layers of winding, this end winding with moulded insulation can be placed between two layers with offset windings, thereby materially improving the insulation between layers. Again, by arranging the straight end windings at the bottom layer of the winding, a series of axial air channels are formed between the lower layers and the top layers thereby materially improving the ventilating conditions of the winding.

To retain both the advantages of increased insulation and increased ventilation, a four layer winding may be arranged as shown in Fig. 3. In this arrangement the winding shown in Fig. 1 is employed, the conductor 4 consisting of two separate conductors in parallel. One of the conductors 4 is arranged between the conductors 2 and 3 as shown, and the other conductor 4 is arranged beneath the conductor 3.

Fig. 4 illustrates a three layer winding employing the form of coil shown in Fig. 2, the conductor 4' consisting of a single conductor bar. Conductors 2' and 3' form the first and second layers respectively, the third or bottom layer of the windings being the straight conductors 4', which have double the cross section of the conductors 4 shown in Fig. 3.

I desire it to be understood that my invention is not limited to the particular arrangement shown and described and I aim in the appended claims to cover all modifications which do not depart from the spirit and scope of my invention.

What I claim as new and desire to secure by Letters Patent of the United States, is:—

1. A dynamo electric machine of the commutating type, having an armature winding comprising coils, each coil comprising a plurality of conductors, two of said conductors of each coil being located substantially 360 electrical degrees apart and another of said conductors of each coil being located substantially 180 electrical degrees from each of said first mentioned conductors.

2. A dynamo electric machine of the commutating type, having an armature winding comprising coils, each coil comprising a plurality of conductors, two of said conductors of each coil being located substantially 360 electrical degrees apart and another of said conductors of each coil being located substantially 180 electrical degrees from each of said first mentioned conductors, each of said coils providing a path for current which flows through said last mentioned conductor and then divides and flows through the two paths formed by said first mentioned conductors.

3. A dynamo electric machine having an armature, said armature comprising a commutator and an armature winding, said armature winding comprising coils, each coil comprising a plurality of conductors, two of said conductors of each coil being substantially 360 electrical degrees apart and another of said conductors of each coil being located substantially 180 electrical degrees from each of said first mentioned conductors, the ends of said conductors at the commutator end of said armature being connected to said commutator.

4. A dynamo electric machine having an armature, said armature comprising a commutator and an armature winding, said armature winding comprising coils, each coil comprising a plurality of conductors, two of said conductors of each coil being substantially 360 electrical degrees apart and another of said conductors of each coil being located substantially 180 electrical degrees from each of said first mentioned conductors, each of said coils providing a path for current which flows through said last mentioned conductor and then divides and flows through the two paths formed by said first mentioned conductors, the ends of said conductors at the commutator end of said armature being connected to said commutator.

In witness whereof, I have hereunto set my hand this twenty-seventh day of February, 1925.

ALAN ADAIR POLLOCK.

DISCLAIMER 1,568,692.—*Alan Adair Pollock*, Leamington Spa, England. DYNAMO-ELECTRIC MACHINE. Patent dated January 5, 1926. Disclaimer filed October 24, 1930, by the assignee, *General Electric Company*.

Hereby enters this disclaimer to claim 1 of said patent which is in the following words:

"1. A dynamo electric machine of the commutating type, having an armature winding comprising coils, each coil comprising a plurality of conductors, two of said conductors of each coil being located substantially 360 electrical degrees apart and another of said conductors of each coil being located substantially 180 electrical degrees from each of said first mentioned conductors."

[*Official Gazette, November 18, 1930*]